United States Patent [19]

Skagerlund

[11] 3,898,588

[45] Aug. 5, 1975

[54] DIODE LASER PUMPING

[75] Inventor: Lars-Erik Skagerlund, Karlskoga, Sweden

[73] Assignee: AB Bofors, Bofors, Sweden

[22] Filed: June 19, 1973

[21] Appl. No.: 371,360

[30] Foreign Application Priority Data

July 3, 1972 Sweden .............................. 8744/72

[52] U.S. Cl. ............ 331/112; 307/252 W; 307/312; 315/209 CD; 315/209 SC; 315/241 R

[51] Int. Cl. .. H03k 3/30; H03k 3/42; H05b 41/392

[58] Field of Search ....... 307/252 J, 252 M, 252 W, 307/275, 312; 315/209 SC, 209 CD, 241 R, 241 P; 331/112

[56] References Cited

UNITED STATES PATENTS

| | | | |
|---|---|---|---|
| 3,237,052 | 2/1966 | Sokolov | 315/241 R X |
| 3,312,860 | 4/1967 | Sturm | 315/209 CD |
| 3,371,232 | 2/1968 | Hannan et al. | 307/312 |
| 3,435,320 | 3/1969 | Lee et al. | 331/112 X |
| 3,487,822 | 1/1970 | Hufton et al. | 315/209 SC |
| 3,496,411 | 2/1970 | Thompson | 315/241 P |
| 3,531,738 | 9/1970 | Thakore | 331/112 X |
| 3,549,944 | 12/1970 | Minks | 315/209 CD |
| 3,677,253 | 7/1972 | Oishi et al. | 315/209 CD X |
| 3,721,884 | 3/1973 | Thakore | 331/112 X |
| 3,721,885 | 3/1973 | McKeown | 331/112 X |

OTHER PUBLICATIONS

General Electric SCR Manual; 5th Edition; 1972; pp. 397.

*Primary Examiner*—Michael J. Lynch
*Assistant Examiner*—L. N. Anagnos

[57] ABSTRACT

A diode laser is pumped or pulsed by a repeated capacitive discharge. A capacitor is periodically charged from a DC voltage source via a transformer, the capacitor being discharged through the diode laser via a controlled switching means after one or more charging periods. During a first interval of each charging period the transformer, while unloaded, stores a specific amount of energy supplied from the DC voltage source. During a subsequent interval of the charging period said specific amount of energy is transmitted from the transformer to the capacitor. The discharging of the capacitor takes place during a first interval of a charging period.

11 Claims, 2 Drawing Figures

DIODE LASER PUMPING

Figure 1:
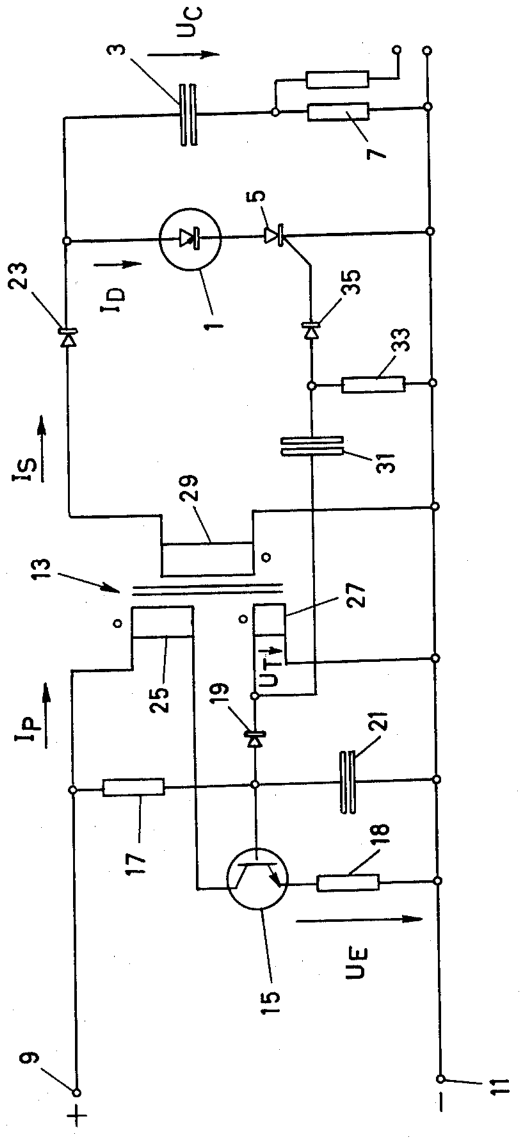

This invention relates to diode laser pumping or pulsing.

When pumping or pulsing a diode laser one usually uses an energy storage means in the form of a capacitor, the capacitor being alternately charged to a suitable voltage and discharged through the diode laser via a controlled switch, preferably a thyristor or a silicon controlled rectifier. Up to now the charging of the capacitor has been accomplished by permanently connecting the capacitor to a DC voltage source via a series resistor. However, this resistor must be fairly high, because otherwise after the discharging of the capacitor the current through the thyristor or the equivalent means used can remain at a level sufficiently high for the thyristor not to turn off. The high series resistance makes the charging time of the capacitor relatively long, which limits the pulse repetition frequency. Furthermore, an essential amount of energy is lost in said series resistor.

An object of the present invention is to provide a method and an apparatus in which the above-mentioned disadvantages are removed and further advantages are obtained. This object is achieved in that the method and the apparatus according to the invention show the features pointed out in the appended claims.

Thus, the method according to the invention is characterized by periodically first storing a predetermined amount of energy in a transformer as magnetic energy substantially without any losses and then transmitting said predetermined amount of energy to the capacitor also substantially without any losses and by discharging said capacitor through the diode laser after one or more periods by bringing the controlled switch to close while simultaneously storing energy in the transformer during the subsequent period. The storing of energy in the transformer is preferably accomplished by electrically connecting a primary winding of the transformer to a DC voltage source during a predetermined time interval while keeping the transformer in an unloaded condition. The energy stored in the transformer is transmitted to the capacitor preferably by electrically connecting a secondary winding of the transformer to said capacitor during a time interval during which the primary winding of the transformer is not electrically connected to the DC voltage source. Suitably, the energy is transmitted via a permanently connected coupling including a rectifying or unilateral conducting means, said means guaranteeing that the transformer is unloaded when the primary winding is connected to the DC voltage source. Said last-mentioned connection is suitably provided by means of a pulse controlled switching means, preferably a transistor, being supplied with control pulses from a control pulse generator. Advantageously, this generator is also used for supplying control pulses in a synchronized way to the thyristor, for instance, of the discharge path of the capacitor. In this way it will be possible to use one and the same control pulse train for simultaneously turning the transistor into its conducting state for connecting the primary winding to the DC voltage source and turning the thyristor on to discharge the capacitor through the diode laser.

The amount of energy first stored in the transformer and then transmitted to the capacitor during each period can be controlled easily when using the method according to the invention by varying the time interval during which the primary winding is connected to the DC voltage source or, in other words, the duration of the control pulses supplied to the transisitor to bring it into its conducting state. Thus, provided that the transformer is not brought into saturation, the current through the primary winding of the transformer will increase linearly in time and because the magnetic energy of the transformer is proportional to the square of the current said magnetic energy also will be proportional to the square of the width of the control pulses. Obviously, it is also possible to control the magnetic energy being stored in the transformer by varying the DC voltage, because the slope of the current curve is determined by the relation of the DC voltage to the inductance of the primary winding.

The apparatus according to the invention for carrying out the above-mentioned method comprises a capacitor to which the diode laser is connected via the controlled switch, and means for alternately charging the capacitor to a specific energy level from a DC voltage source and discharging the capacitor through the diode laser by bringing said controlled switch to be closed temporarily after said energy level has been reached in the capacitor. The apparatus is essentially characterized in that said means comprises a transformer having a primary winding and a secondary winding, said primary winding being connected to the DC voltage source via a pulse controlled switching means and said secondary winding being connected to the capacitor via a rectifying or unilateral conducting means being coupled so that the transformer will be unloaded when said pulse controlled switching means is closed for connecting the primary winding to the DC voltage source, a control pulse generator being arranged to supply control pulses to said pulse controlled switching means so that it periodically will be closed during a specific time interval, and discharge control means for periodically causing said controlled switch in the capacitor discharge path, that includes the diode laser, to be closed temporarily while said controlled switching means is closed. Preferably, said control pulse generator is arranged to constitute said discharge control means also.

According to a preferred embodiment said pulse controlled switching means is a transistor, the apparatus being self-oscillating by feed-back coupling from the transformer. The control pulse generator then includes means for transistor base supply and a feed-back winding on the transformer, said winding being connected to the base of the transistor. Preferably, the feed-back winding is used also as a discharge control means together with means for transmitting control pulses from said winding to the controlled switch in the capacitor discharge path.

Preferably, a thyristor is used as the controlled switch in the capacitor discharge path. However, other types of controlled switches such as an avalanche transistor, may be used. Particularly when using a thyristor it may be advantageous to include a series-connected pnpn-diode in said transmitting means for speeding up the thyristor control pulses. In certain cases it may also be advantageous to include in said transmitting means means for inhibiting a predetermined number of control pulses between each capacitor discharge, that is the thyristor, for instance, can be turned on only after a predetermined number of energy storage periods. For instance, such a means can be a pulse counting means. Furthermore, said transmitting means can include a gating means being trigged when the capacitor voltage has reached a predetermined level. The last-mentioned approaches both permit for-instance the thyristor to be turned on in a most specific phase position when a self-oscillating transistor-transformer-circuit is used. Obviously, the pnpn-diode, the counting means, and the gating means can be used when the apparatus is not self-oscillating as well.

Figure 2:
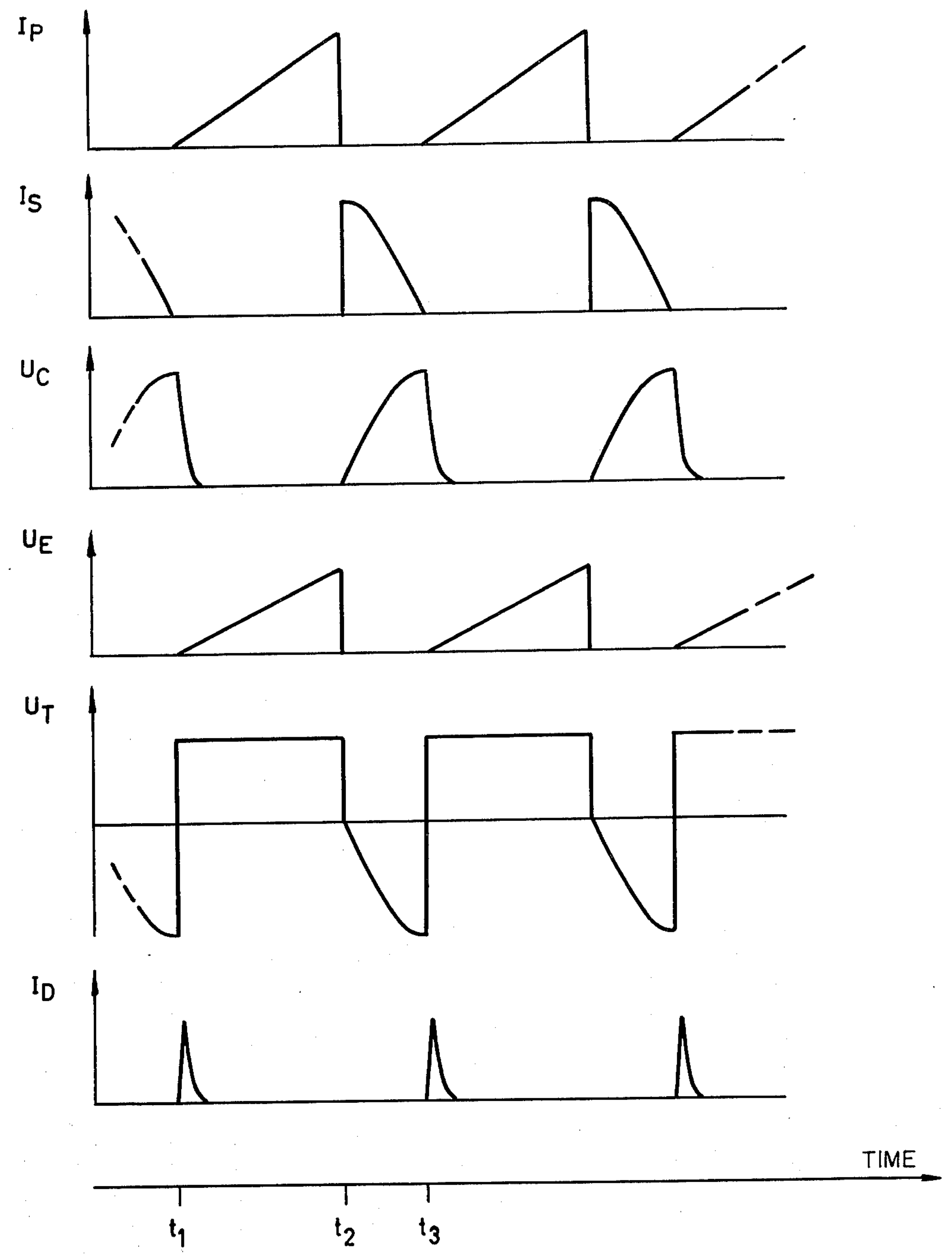

The invention will be further described hereinafter by an example while referring to the enclosed drawings, in which:

FIG. 1 shows a circuit diagram of a preferred apparatus for pumping a diode laser in accordance with the present invention, and FIG. 2 is a pulse diagram intended for making it easier to understand the mode of operation of the apparatus according to FIG. 1.

In the apparatus according to FIG. 1 a diode laser 1 is connected to a capacitor 3 via a thyristor 5 and a small resistor 7, as previously known, the resistor being part of a circuitry, not shown, for monitoring the pumping current. The capacitor 3 is charged from a DC voltage source, of which only the terminals 9 and 11 are shown, via a self-oscillating circuit including a transformer 13, a transistor 15, a resistor 17 for transistor base supply, an emitter resistor 18, a first diode 19, a capacitor 21 and a second diode 23. A primary winding 25 of the transformer is connected between the collector of the transistor 15 and one terminal 9 of the DC voltage source. A feed-back winding 27 of the transformer is connected to the base of the transistor via the diode 19 and to the other terminal 11 of the DC voltage source. The capacitor 3 is connected to a secondary winding 29 of the transformer via the diode 23. The winding directions of the separate transformer windings have been marked by dots at the winding ends corresponding to each other.

The thyristor 5 is supplied with control pulses from the winding 27 via a differentiating circuit comprising a capacitor 31 and a resistor 33 and via a pnpn-diode 35, connected in series.

The function of the apparatus, illustrated in an idealized form by the pulse diagram of FIG. 2, is as follows: At time $t_1$ the transistor 15 begins to conduct, thus connecting the primary winding 25 to the DC voltage source via the emitter resistor 18. In view of the fact that the diode 23 is connected in its reverse direction relative to the voltage hereby induced in the secondary winding, the transformer will be unloaded and the current $I_P$ through the primary winding 25, the transistor 15, being saturated, and the resistor 18 will increase substantially linearly in time.

The slope of the current curve will be determined by the ratio V/L between the DC voltage V and the primary winding inductance L that is presumed to be constant. Consequently, also the voltage $U_E$ across the emitter resistor 18 will increase linearly in time. However, the resistor 18 is so small that the voltage across the primary winding 25 can be regarded as being constant. The voltage $U_T$ transformed to the feed-back winding 27 thus also can be regarded as being substantially constant, the voltage being a certain fraction of the voltage across the primary winding.

The voltage at the base of the transistor 15 substantially follows the emitter voltage $U_E$ and, to start with, is less than $U_T$, therefore causing current conduction through the diode 19 to be blocked.

At time $t_2$ the voltage at the transistor base equals $U_T$ and the diode 19 begins to conduct. Consequently, transistor 15 no longer has a sufficient base supply to saturate, thus causing current flow to come to a stop which means the transistor 15 switches to its nonconducting state. In this situation the magnetic energy of the transformer is $W_m = ½ L \hat{I}_P^2$, $\hat{I}_P$ being the peak value of the current through the primary winding.

At the reversal, a magnetizing current $I_S$ is obtained in the secondary winding 29 of the transformer, said current being supplied to the capacitor 3 via the diode 23. If the circuit is considered to be free of losses the capacitor voltage will increase sinusoidally while simultaneously the current $I_S$ decreases sinusoidally until the magnetic energy has been pumped out of the transformer. This has been done at time $t_3$, and the energy in the capacitor $W_C = ½ C \hat{U}_C^2$ then is equal to the magnetic energy $W_m$ previously stored in the transformer. C is the capacitance of the capacitor and $\hat{U}_C$ is the peak value of the capacitor voltage.

Thus, between times $t_2$ and $t_3$ the diode 23 is conducting and, therefore, the voltage across the secondary winding 29 substantially follows the capacitor voltage $U_C$. The voltage $U_T$ transformed to the feed-back winding 27 consequently changes polarity at time $t_2$, being a certain fraction of said voltage $U_C$. Simultaneously, the diode 19 is conducting and the transistor 15 is maintained in its nonconducting state.

At time $t_3$ $I_S$ becomes zero and the diode 23 is blocked. Consequently, the voltages across the secondary winding 29 and the feed-back winding 27 become zero, the diode 19 is blocked and another reversal is obtained in that the transistor 15 is again switched into its conducting state. The capacitor 21 having relatively low impedance prevents transformer leakage inductance from causing parasitic oscillation.

Thus, at time $t_3$ the primary winding 25 is again connected to the DC voltage source, which, as described, causes a voltage pulse to be found across the feed-back winding 27. This pulse is transmitted to the differentiating circuit consisting of the capacitor 31 and the resistor 33. The short pulse obtained, corresponding to the voltage pulse rising edge, is speeded up by the pnpn-diode 35. Thereafter, the pulse turns on the thyristor 5, whereby the capacitor 3 is discharged through the diode laser 1. Consequently, the pumping current pulse $I_D$ occurs immediately after time $t_3$ while simultaneously energy again begins to be stored in the transformer. In doing so the transformer secondary circuit is at rest, which means that, no doubt, the thyristor is turned off, when the discharge current falls below a certain value.

As disclosed, the voltages across the emitter resistor 18 and the feed-back winding 27 determine the extent to which the current $I_P$ through the primary winding may increase before reversal occurs. This means that the easiest way of controlling $\hat{I}_P$ and, consequently, the pumping current through the diode laser is to vary the emitter resistor. Therefore, the emitter resistor should be variable. As an alternative the DC voltage may be varied for the same purpose. In both cases also the pumping frequency will be affected.

What is claimed is:

1. An apparatus for pumping a diode laser, which comprises:

a capacitor;

a first controlled switching means, the diode laser being connected to said capacitor via said first controlled switching means; and means for alternately charging the capacitor from a D.C. voltage source to a specific energy level and discharging the capacitor through the diode laser by temporarily closing said first controlled switching means when said specific energy level of the capacitor has been reached, said means including:

a pulse controlled transistor switching means;

a transformer having a primary winding, a secondary winding and a feedback winding, the primary winding being connected to one terminal of the D.C. voltage source and the collector of the transistor, the secondary winding being connected to the capacitor via a unidirectional conducting means poled so that the transformer will be unloaded when the transistor is conducting, and the feedback winding being connected to the base of the transistor via a diode and to the other terminal of the D.C. voltage source for supplying control pulses to the transistor;

means for providing transistor base supply;

an emitter resistor connected between the emitter of the transistor and said other terminal of the D.C. voltage source thereby to provide a self oscillating circuit with the transistor becoming periodically conducting by said control pulses during a predetermined interval; and discharge control means for periodically causing said first controlled switching means to be closed temporarily while the transistor is conducting.

2. An apparatus according to claim 1 wherein the discharge control means includes the transformer feedback winding and circuit means for transmitting control pulses from said feedback winding to said first controlled switching means.

3. An apparatus according to claim 2 wherein said transmitting circuit means includes a differentiating circuit.

4. An apparatus according to claim 2 wherein said transmitting circuit means includes a series-connected pnpn-diode for speeding up the transmitted control pulses.

5. An apparatus according to claim 1 wherein the first controlled switching means is a thyristor.

6. An apparatus according to claim 1 further including a capacitor connected between the base of the transistor and said other terminal of the D.C. voltage source.

7. An apparatus for pumping a diode laser, which comprises:

a capacitor;

a first controlled switching means, the diode laser being connected to said capacitor via said first controlled switching means; and means for alternately charging the capacitor from a D.C. voltage source to a specific energy level and discharging the capacitor through the diode laser by temporarily closing said first controlled switching means when said specific energy level of the capacitor has been reached, said means including:

a transformer having a primary winding, a secondary winding and a feedback winding, the primary winding being connected to the D.C. voltage source via a pulse controlled switching means and the secondary winding being connected to the capacitor via a unidirectional conducting means poled so that the transformer will be unloaded when said pulse controlled switching means is closed;

means for applying control pulses to said pulse controlled switching means including a circuit for connecting said feedback winding to said pulse controlled switching means and to one of the terminals of the D.C. voltage source, so that periodically said pulse controlled switching means will be closed during a predetermined time interval; and discharge control means for periodically causing said first controlled switching means to be closed temporarily while said pulse controlled switching means is closed, said discharge control means including the transformer feedback winding and means for transmitting control pulses from said feedback winding to said first controlled switching means.

8. An apparatus according to claim 7 wherein the pulse controlled switching means includes a transistor and means for providing transistor base supply from said D.C. voltage source; and said control pulses are supplied to the base of said transistor.

9. An apparatus according to claim 8 wherein the transformer primary winding is connected between the collector of the transistor and one terminal of the D.C. voltage source;

a base supply resistor is connected between the base of the transistor and said one terminal of the D.C. voltage source;

an emitter resistor is connected between the emitter of the transistor and the other terminal of the D.C. voltage source; and said feedback winding is connected at one end to the base of the transistor via a diode and at the other end to said other terminal of the D.C. voltage source.

10. A method of pumping a diode laser comprising:

storing a specific amount of energy in a transformer in the form of magnetic energy during a first time interval when a transformer primary winding charging circuit is in a current conducting condition;

periodically interrupting the primary winding charging circuit by a first control signal generated in a circuit including a feedback winding on said transformer;

transferring the stored magnetic energy from said transformer to a capacitor through a secondary winding on said transformer through a circuit including a unidirectional current conducting device poled so as to prevent current flow during the first time interval when the primary winding charging circuit is in a current conducting condition; and discharging said capacitor through said laser by an electronic switching element which is triggered to a conducting condition by a second control signal generated in a circuit including said feedback winding on said transformer, the length of said second control signal being much shorter than the length of said first control signal.

11. A method of pumping a diode laser comprising:

providing a self oscillating circuit including a transistor having an emitter-collector circuit connected in series with a transformer primary winding and a D.C. voltage source;

controlling the operation of said oscillating circuit by a first control signal pulse generated in a circuit including a feedback winding on said transformer and applied to the base of said transistor;

charging a capacitor through a secondary winding on said transformer through a circuit including a unidirectional current conducting device poled so as to be non-conducting when current is passing through the transformer primary winding;

discharging said capacitor through said laser by an electronic switching element containing a control electrode;

generating a second control signal pulse for rendering said electronic switching element conductive through a circuit including said feedback winding on said transformer and a pulse narrowing circuit; and adjusting the amount of energy stored in said capacitor by varying the length of the first control signal pulses applied to said transistor base.

* * * * *